United States Patent
McCulley et al.

(10) Patent No.: US 6,751,295 B2
(45) Date of Patent: Jun. 15, 2004

(54) METHOD AND APPARATUS FOR MEASURING COMMUNICATION MARKET STATISTICS

(75) Inventors: Scott L. McCulley, Moneta, VA (US); Marcus P. Wright, Lynchburg, VA (US); Steven J. Cuppy, Lynchburg, VA (US); David A. Simon, Lynchburg, VA (US)

(73) Assignee: Criterion Wireless Corp., Lynchburg, VA (US)

( * ) Notice: Subject to any disclaimer, the term of this patent is extended or adjusted under 35 U.S.C. 154(b) by 0 days.

(21) Appl. No.: 10/263,782

(22) Filed: Oct. 4, 2002

(65) Prior Publication Data

US 2003/0190015 A1 Oct. 9, 2003

Related U.S. Application Data

(60) Provisional application No. 60/369,339, filed on Apr. 3, 2002, provisional application No. 60/369,326, filed on Apr. 3, 2002, and provisional application No. 60/407,700, filed on Sep. 4, 2002.

(51) Int. Cl.[7] .............................................. H04M 3/22
(52) U.S. Cl. ............................. 379/10.01; 379/27.02; 379/221.13
(58) Field of Search ......................... 379/10.01, 10.02, 379/10.03, 32.01, 27.02, 27.03, 27.04, 29.01, 31, 221.13, 221.14, 221.02, 111, 114.02, 114.01, 112.01, 133, 9.02, 45; 455/433, 445, 410, 461, 551, 405; 370/252

(56) References Cited

U.S. PATENT DOCUMENTS

| | | | | |
|---|---|---|---|---|
| 6,028,914 A | * | 2/2000 | Lin et al. | 379/14 |
| 6,049,599 A | * | 4/2000 | McCausland et al. | 379/111 |
| 6,169,896 B1 | * | 1/2001 | Sant et al. | 455/424 |
| 2002/0069037 A1 | | 6/2002 | Hendrickson et al. | |

FOREIGN PATENT DOCUMENTS

| | | |
|---|---|---|
| WO | WO 00/56098 | 9/2000 |
| WO | WO 02/19625 A2 | 3/2002 |

* cited by examiner

*Primary Examiner*—Duc Nguyen
*Assistant Examiner*—Barry W Taylor
(74) *Attorney, Agent, or Firm*—Burns, Doane, Swecker & Mathis, LLP

(57) ABSTRACT

Methods and apparatus are provided for determining market statistics for communication service providers. Determinations of whether or not a sampling of telephone numbers are assigned by a particular service provider are employed to determine market statistics. A message which is used to obtain a response. The response is interpreted to determine whether or not the telephone number associated with the wireless device is assigned. Alternatively, a sampling of telephone numbers are dialed over a digital line. Based upon the result of the dialing, it is determined whether or not the telephone numbers are assigned by the service provider. Telephone numbers which have been ported between service providers in networks which employ local number portability can be accounted for in the determination of market statistics. A telephone number portability database can also be employed for determining whether or not a telephone number is assigned by a service provider.

56 Claims, 16 Drawing Sheets

| WSP | NPA | NXX | X | No. of NPA-NXX-X Ranges | Maximum Possible MINs |
|---|---|---|---|---|---|
| WSP A | 434 | 426 | 0-9 | 10 | 10,000 |
|  | 434 | 427 | 0-9 | 10 | 10,000 |
|  | 434 | 428 | 0-9 | 10 | 10,000 |
| WSP B | 434 | 660 | 0-9 | 10 | 10,000 |
|  | 434 | 661 | 0-5 | 6 | 6,000 |
|  | 434 | 662 | 3-6 | 4 | 4,000 |

Fig. 3

| Service Provider | Telephone Number | Provider Before WLNP | Provider After WLNP |
|---|---|---|---|
| WSP A | 201-981-1111 | WSP A | WSP A |
|  | 201-981-2222 | WSP A | WSP B |
|  | 201-981-3333 | WSP A | Landline A |
|  | 201-981-4444 | WSP A | WSP A |
| WSP B | 201-320-5555 | WSP B | WSP B |
|  | 201-320-6666 | WSP B | WSP A |
|  | 201-320-7777 | WSP B | Landline A |
|  | 201-320-8888 | WSP B | WSP B |
| Landline A | 201-595-9999 | Landline A | WSP A |
|  | 201-595-9990 | Landline A | WSP B |
|  | 201-595-9980 | Landline A | Landline A |

Fig. 4

| Recording | Clipping | Meaning |
|---|---|---|
| The subscriber you have called is not answering at this time. | Is not answering | Assigned |
| The number you have dialed is not a working number. | Not a working number | Unassigned |
| The number you have dialed has been disconnected. | Been disconnected | Unassigned |
| The customer you have called is not available at this time. | Is not available at this time | Assigned |
| The customer you have called is unavailable or has traveled outside the coverage area. | Has traveled outside the coverage | Assigned |
| The number or code you dialed is incorrect. | Code you dialed is incorrect | Unassigned |

Fig. 19

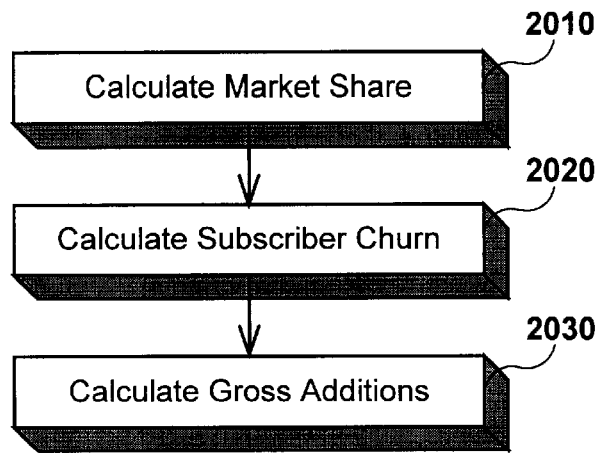

Fig. 20

| WSP | NPA | NXX | X | No. of NPA-NXX-X Ranges | Maximum Possible MINs | No. of Test MINs | Assigned MINs | Unassigned MINs | Estimated MINs |
|---|---|---|---|---|---|---|---|---|---|
| WSP A | 434 | 426 | 0-9 | 10 | 10,000 | 500 | 325 | 175 | 6,500 |
|  | 434 | 427 | 0-9 | 10 | 10,000 | 500 | 255 | 245 | 4,500 |
|  | 434 | 428 | 0-9 | 10 | 10,000 | 500 | 120 | 380 | 2,400 |
| WSP B | 434 | 660 | 0-9 | 10 | 10,000 | 500 | 450 | 50 | 9,000 |
|  | 434 | 661 | 0-5 | 6 | 6,000 | 300 | 255 | 75 | 4,500 |
|  | 434 | 662 | 3-6 | 4 | 4,000 | 200 | 175 | 25 | 3,500 |

Fig. 21A

| WSP | NPA | NXX | X | No. of NPA-NXX-X Ranges | Maximum Possible MINs | No. of Test MINs | No. of MIN Assigned January 1 and Unassigned on February 1 | Estimated Churn MINs |
|---|---|---|---|---|---|---|---|---|
| WSP A | 434 | 426 | 0-9 | 10 | 10,000 | 500 | 15 | 300 |
|  | 434 | 427 | 0-9 | 10 | 10,000 | 500 | 20 | 400 |
|  | 434 | 428 | 0-9 | 10 | 10,000 | 500 | 17 | 340 |
| WSP B | 434 | 660 | 0-9 | 10 | 10,000 | 500 | 25 | 500 |
|  | 434 | 661 | 0-5 | 6 | 6,000 | 300 | 16 | 320 |
|  | 434 | 662 | 3-6 | 4 | 4,000 | 200 | 8 | 160 |

Fig. 21B

| WSP | NPA | NXX | X | No. of NPA-NXX-X Ranges | Maximum Possible MINs | No. of Test MINs | No. of MIN Unassigned January 1 and Assigned on February 1 | Estimated Gross Add MINs |
|---|---|---|---|---|---|---|---|---|
| WSP A | 434 | 426 | 0-9 | 10 | 10,000 | 500 | 20 | 400 |
|  | 434 | 427 | 0-9 | 10 | 10,000 | 500 | 23 | 460 |
|  | 434 | 428 | 0-9 | 10 | 10,000 | 500 | 20 | 400 |
| Growth | 434 | 429 | 0-9 | 10 | 10,000 | 500 | 10 | 200 |
| WSP B | 434 | 660 | 0-9 | 10 | 10,000 | 500 | 27 | 540 |
|  | 434 | 661 | 0-5 | 6 | 6,000 | 500 | 20 | 400 |
|  | 434 | 662 | 3-6 | 4 | 4,000 | 200 | 10 | 200 |

New Time Ranges

Fig. 21C

|  |  | Service Provider on February 1 | | | | |
|---|---|---|---|---|---|---|
| Service Provider on January 1 | Samples | WSP A | WSP B | WSP C | Landline A | Landline B |
| WSP A | 10,000 | 9,945 | 30 | 25 | 0 | 0 |
| WSP B | 10,000 | 200 | 9,500 | 200 | 50 | 50 |
| WSP C | 10,000 | 250 | 50 | 9,700 | 0 | 0 |
| Landline A | 10,000 | 50 | 200 | 150 | 9,600 | 30 |
| Landline B | 10,000 | 40 | 250 | 300 | 10 | 9,400 |

Fig. 22A

|  |  | Switch Rate from January 1 to February 1 | | | | |
|---|---|---|---|---|---|---|
| Service Provider on January 1 | Samples | WSP A | WSP B | WSP C | Landline A | Landline B |
| WSP A | 100% | 99.45% | 0.30% | 0.25% | 0% | 0% |
| WSP B | 100% | 2.00% | 2.00% | 95.00% | 0.50% | 0.50% |
| WSP C | 100% | 2.50% | 0.50% | 97.00% | 0% | 0% |
| Landline A | 100% | 0.50% | 2.00% | 1.50% | 96.00% | 0.30% |
| Landline B | 100% | 0.40% | 2.50% | 3.00% | 0.10% | 94.00% |

Fig. 22B

METHOD AND APPARATUS FOR MEASURING COMMUNICATION MARKET STATISTICS

CROSS-REFERENCE TO RELATED APPLICATIONS

The present application claims priority to U.S. Provisional Application No. 60/369,339 filed Apr. 3, 2002; U.S. Provisional Application No. 60/369,326 filed Apr. 3, 2002; and U.S. Provisional Application No. 60/407,700 filed Sep. 4, 2002. The entire contents of these provisional applications are herein expressly incorporated by reference.

FIELD OF INVENTION

The present invention relates to the measurement of communication market statistics. More particularly, the present invention relates to a method and apparatus for measuring market statistics for communication market service providers.

BACKGROUND INFORMATION

Over the past 20 years wireless communication services have progressed from being used as a toy and a status symbol for the rich, to an indispensable communication tool for the common citizen. Currently the wireless penetration rate in the United States is approximately 50%. In other words, half of the United States' 280 million population subscribe to wireless communication services. As the wireless communication industry has grown, competition for subscribers continues to increase. For example, some wireless communication markets which were previously served by only two wireless service providers (WSP) are now served by as many as nine different wireless service providers. Accordingly, each wireless service provider is vying for subscribers in a particular market with many other wireless service providers.

As competition between wireless service providers intensifies and as market conditions change rapidly, often on a market-by-market basis, wireless service providers need to obtain reliable market statistics about themselves and their competition in order to make strategic and tactical decisions. Since the wireless service providers are competing over the same subscribers, these wireless service providers are not willing to share market information with their competitors. Accordingly, it would be desirable to obtain reliable measurements of market information, e.g., market share information, regarding competitors in the wireless services market.

One technique for obtaining market share information is through the use of conventional surveys. These surveys involve asking a series of questions via, e.g., telephonic communication means, written communication means or oral communication means. However, due to the costs involved with these surveys, the surveys typically have a very low sample rates. In addition, due to consumer confusion regarding wireless communication services, these surveys tend to have a bias which skews the results. For example, when asked what wireless service provider a particular person subscribes to, many people respond with the name of the manufacturer of the wireless handset instead of the name of the wireless service provider. The high costs, low sample rate, and the bias of these traditional surveys do not provide adequate results upon which a wireless service provider can base business decisions.

Another technique for obtaining market share information is known as the dial down technique. Currently each wireless service provider is assigned a range of telephone numbers, known as a line range, for which it can assign to wireless subscribers. To accommodate new subscribers, a wireless service provider will, at any particular point in time, have only a limited number of the telephone numbers in a line range assigned to subscribers. Accordingly, the dial down technique involves employing a bank of telephone operators dialing line ranges assigned to a particular wireless service provider. These operators then listen to the connection of the call to determine whether a particular number within the line range has been assigned to a subscriber. The use of operators listening to call connections is very high in cost, and is very time consuming. The high costs and the time consuming nature of this technique will result in a low sample rate. Accordingly, this technique does not provide adequate results upon which a wireless service provider can base business decisions.

A newer technique for obtaining market share information is known as the over the air (OTA) technique. This technique involves placing specialized receivers throughout a particular market to collect data from the control channel transmissions between wireless devices and wireless networks. Specifically, many wireless standards employed in the United States require a wireless device's mobile identification number (MIN) to be transmitted between the wireless network and the wireless device. A MIN is transmitted between a network and a wireless device when a wireless device is turned on, turned off, receives an incoming call, places an outgoing call, and is turned on waiting for a call to be placed or received. Accordingly, these specialized receivers will collect MINs from the forward control channel and log each MIN transmitted between wireless devices and a network. After a period of time, the number of unique MINs received by the specialized receivers are employed as a statistical sampling of the number of MINs assigned within a particular line range.

Although the over the air technique is more accurate and often less costly than the previous techniques, the over the air technique suffers from many deficiencies. For example, there is a percentage of wireless subscribers who only use their wireless devices in case of emergency. Similarly, some users of wireless devices travel for extended periods of time away from their home market. Accordingly, the over the air technique is likely to not account for these subscribers. In addition, the over the air technique requires the cost of the specialized receivers, and the cost of the manpower to place and remove the specialized receivers from the field. Moreover, some communications standards, e.g., the Global System for Communication (GSM) and the Integrated Digital Enhanced Network (iDEN), do not transmit MINs over a forward control channel, thus rendering this technique useless for measurements of these types of systems. Furthermore, obtaining accurate measurements for subscriber churn and gross additions using the over the air technique is difficult and inexact. In addition, local number portability adds further complications to the over the air technique.

Accordingly, it would be desirable to provide methods and apparatus which can provide statistically accurate estimates of market statistics without the high costs, low sample rates, and technical barriers of the previous techniques. It would also be desirable to provide measurements other than market share, such as subscriber churn and gross additions.

SUMMARY OF THE INVENTION

The present invention provides method and apparatus for determining market statistics for communication service providers. Specifically, the present invention employs determinations of whether or not a sampling of telephone numbers are assigned by a particular service provider to determine market statistics. In accordance with one embodiment of the present invention, queries of a Local Number Portability database are used to determine whether or not a telephone number has been assigned by a service provider. These queries are also employed to collect statistics regarding the porting of telephone numbers among service providers. In accordance with another embodiment of the present invention, a message is used to obtain a response. The response is interpreted to determine whether or not the telephone number associated with the wireless device is assigned. In accordance with yet another embodiment of the present invention, a sampling of telephone numbers are dialed over a digital line. Based upon the result of the dialing, it is determined whether or not the telephone numbers are assigned by the service provider. The present invention can also account for telephone numbers which have been ported between service providers in networks which employ local number portability.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein:

FIG. 3 illustrates a table of wireless service providers and associated line ranges in accordance with exemplary embodiments of the present invention;

FIG. 4 illustrates a table of service providers and associated telephone numbers in a system which employs local number portability in accordance with exemplary embodiments of the present invention;

FIG. 19 illustrates an exemplary table for interpreting the results of the testing of telephone numbers in accordance with the third embodiment of the present invention;

FIG. 20 illustrates a method for calculating statistics in accordance with exemplary embodiments of the present invention;

FIGS. 21A–C illustrate tables of measured market statistics in accordance with exemplary embodiments of the present invention; and FIGS. 22A and 22B illustrate tables of measured market statistics for systems which employ local number portability in accordance with exemplary embodiments of the present invention.

DETAILED DESCRIPTION

Figure 1:
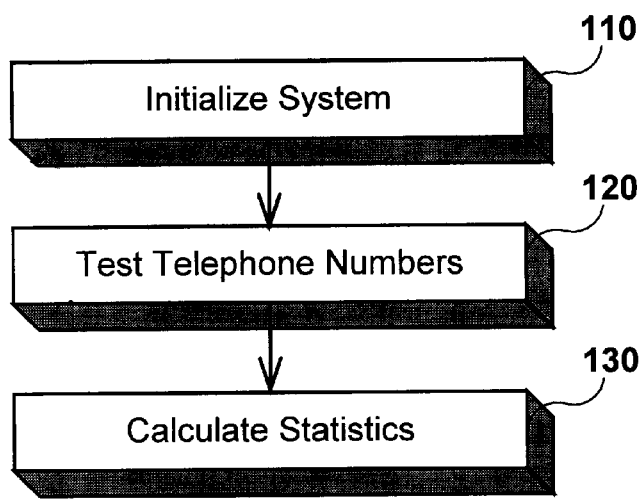
FIG. 1 illustrates a method for measuring market statistics in accordance with exemplary embodiments of the present invention.

FIG. 1 illustrates a method for measuring market statistics in accordance with exemplary embodiments of the present invention. The method illustrated in FIG. 1 is generic to the first, second and third embodiments of the present invention. The overall method of the present invention involves initializing the system (step 110), testing telephone numbers, e.g., MINs, Mobile Directory Numbers (MDNs), and the like, (step 120), and calculating statistics using the tested telephone numbers (step 130).

Figure 2:
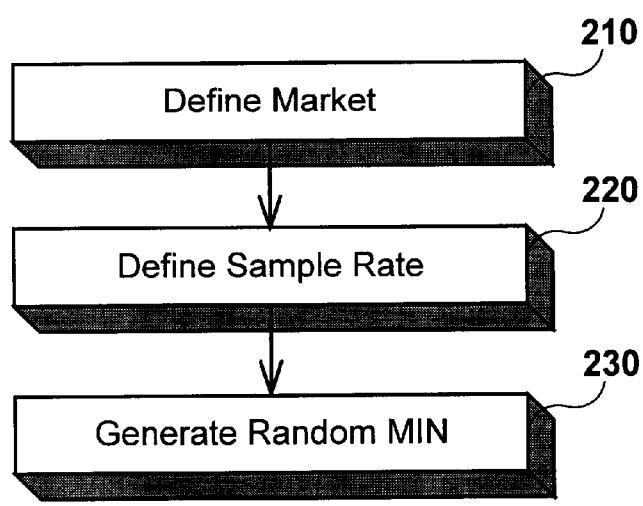
FIG. 2 illustrates a method for initializing the system for measuring market statistic in accordance with exemplary embodiments of the present invention.

FIG. 2 illustrates a method for initializing the system of the present invention. Initially, the relevant market for which the statistics are collected is defined (step 210). To determine market statistics, the present invention tests MINs to determine whether or not they are assigned to a subscriber. It will be recognized that in the United States a MIN takes the form of NPA-NXX-XXXX, where NPA is the area code, NXX is the central office exchange code, and XXXX is the extension number. Accordingly, a control computer of the system of the present invention is loaded with the NPA-NXX and/or NPA-NXX-X ranges for all wireless service providers serving a market of interest, e.g., a city, county(s), area code(s) or metropolitan area.

It will be recognized that the NPA-NXX information represents 10,000 MINs, and the wireless service provider associated with a particular NPA-NXX is available from the North American Numbering Plan Association (NANPA). It will also be recognized that the NPA-NXX-X information represents 1,000 MINs, and the wireless service provider associated with a particular NPA-NXX, NPA-NXX-X, NPA-NXX-XX, NPA-NXX-XXX, and/or NPA-NXX-XXXX is available from the Local Exchange Routing Guide (LERG). Other sources of information regarding which wireless service provider a particular line range belongs to are also available, such as the Crossroads database from TSI Telecommunications Services, Inc.

FIG. 3 illustrates an exemplary table of wireless service providers and their associated line ranges. As illustrated in FIG. 3, a wireless service provider, e.g., wireless service provider A, can be assigned three NPA-NXX line ranges. Moreover, another wireless service provider, e.g., wireless service provider B, can be assigned one entire NPA-NXX line range and several NPA-NXX-X line ranges. As illustrated in FIG. 3, when a wireless service provider is assigned a portion of a NPA-NXX line range, the wireless service provider can be assigned anywhere from 1 to 10,000 telephone numbers. Also illustrated in FIG. 3, wireless service provider B has one full NPA-NXX line range and two partial NPA-NXX line ranges. As illustrated in FIG. 3, wireless service provider A has 30,000 MINs which could be assigned, while wireless service provider B has 20,000 MINs which could be assigned. If wireless service providers A and B were the only wireless service providers in the market, there are a total of 50,000 MINs which could be assigned to subscribers in the market.

Returning to FIG. 2, after the market has been defined (step 210), a sample rate for the measurements is determined (step 220). It will be recognized that it is not necessary to sample all of the possible MINs in a market to obtain reliable market statistics. A much lower sampling rate, e.g., 2–5%, will provide reliable market statistics within a certain statistical confidence interval. The sample rate is combined with the total number of MINs which could be assigned to subscribers in the market. Accordingly, using the market illustrated in the table of FIG. 3 as an example, if a 5% sampling rate is desired, 2,500 MINs will be individually tested.

After the sample rate has been determined (step 220), the system generates random MINs for testing (step 230). Using a 5% sampling rate for the market illustrated in FIG. 3, 1,500 unique MINs will be randomly generated for wireless service provider A (5%*30,000), and 1,000 unique MINs will be randomly generated for wireless service provider B (5%*20,000). If necessary, the present invention can also generate random MINs on the NPA-NXX-XX or the NPA-NXX block level, or any other level. The MINs in the list of randomly generated MINs are referred to as the test MINs. It will be recognized that the generation of random numbers within a particular range is well known in the art, and hence, the manner in which the numbers are generated is not described in detail.

After the system has been initialized, the telephone numbers, e.g., MINs or MDNs, are tested. The manner in which MINs are tested (step 120) differs between the first, second and third embodiments of the present invention.

Currently the Federal Communications Commission (FCC) is requiring wireless service providers in the major U.S. markets to implement wireless local number portability (WLNP) by November 2003. Wireless local number portability allows a subscriber to maintain a telephone number when the subscriber switches from one service provider to another. In the context of wireless local number portability, a telephone number is referred to as a Mobile Directory Number (MDN). The process of maintaining the same MDN when switching service providers is referred to as "porting"

a number. Wireless local number portability will allow porting of a telephone number from one wireless service provider to another. Further planned evolutions of local number portability include porting a telephone number from a landline service provider to a wireless service provider and from a wireless service provider to a landline service provider. Porting a landline number from one landline service provider to another landline service provider exists today. The scope of invention will account for wireless and landline portability.

Once wireless local number portability is implemented, a MDN will no longer be property of a wireless service provider. Instead, the MDN will be property of the subscriber, who is free to move the MDN from one communications provider to another within the same geographical area. Thus, over time, the 10,000 MDNs in a line range originally assigned to a wireless service provider may contain MDNs assigned to other wireless service providers or to landline service providers. Movement of a MDN from one service provider to another is illustrated in FIG. 4.

Figure 5:
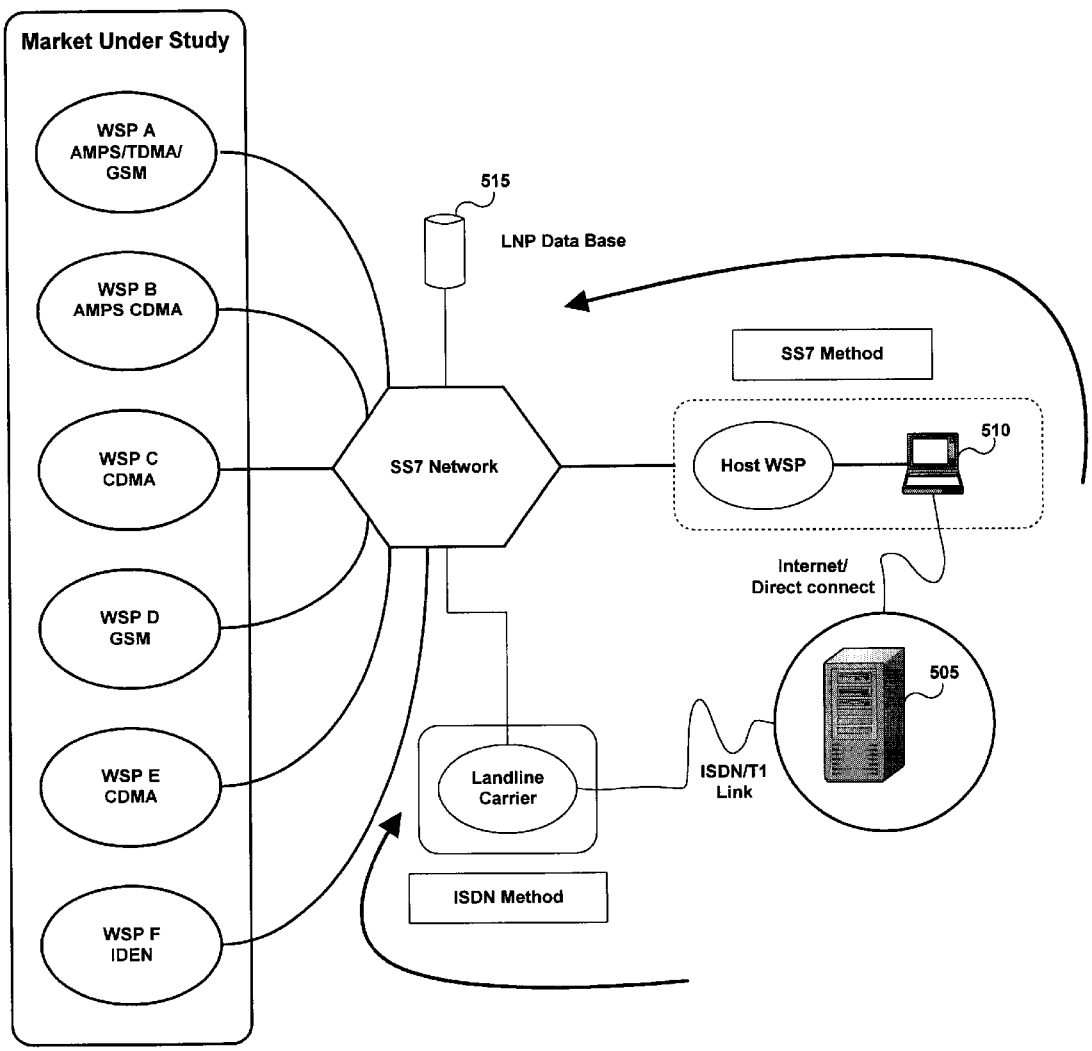
FIG. 5 illustrates a system for measuring market statistics in systems which employ local number portability in accordance with exemplary embodiments of the present invention.

FIG. 5 illustrates an exemplary system for measuring market statistics in a market which employs local number portability. The market illustrated in FIG. 5 has six wireless service providers, WSP A-WSP F. As illustrated in FIG. 5, the wireless service providers can use any type of air interface standard, e.g., AMPS, TDMA, GSM, CDMA, and iDEN. The techniques described below in connection with the second and third embodiments of the present invention can be implemented in the system of FIG. 5. Specifically, in accordance with the second embodiment of the present invention, the computer 505 controls test equipment 510 to query the HLRs with a "Query With Permission" type message. Similarly, computer 505 can place calls over a digital line, e.g., an ISDN or a T1 link, in accordance with the third embodiment of the present invention.

To account for wireless local number portability, the present invention incorporates information stored in the Local Number Portability (LNP) database 515 for determining whether or not a telephone number has been ported, and when calculating the market statistics. Local Number Portability databases will updated and maintained by various companies including, for example, TSI Telecommunications, Inc. and VeriSign Telecommunications, Inc. (formerly Illuminet). As illustrated in FIG. 5, Local Number Portability databases will be accessible via the SS7 network. The Local Number Portability databases are intended to be used to obtain destination point code (DPC) information for routing calls. It will be recognized that a destination point code is similar to an IP address, except that a point code identifies a network node in order for the SS7 network to properly route calls. The accessing of Local Number Portability database and receiving information back is referred to as a database "DIP".

Figure 6:
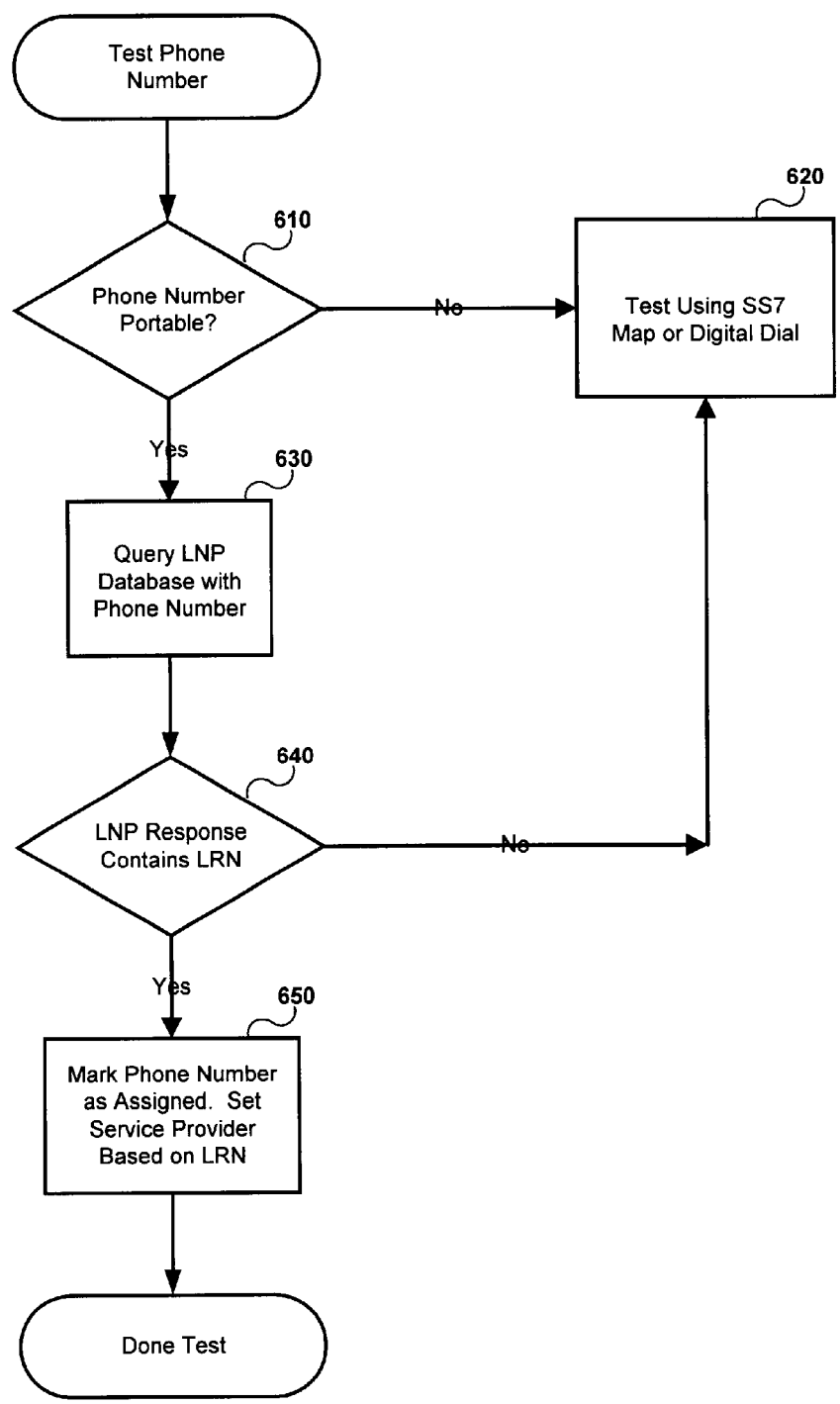
FIG. 6 illustrates an exemplary method incorporating the first, second and third embodiments of the present invention.

FIG. 6 illustrates an exemplary method describing the relationship of the first, second and third embodiments of the present invention. Specifically, FIG. 6 illustrates an exemplary method for testing a telephone number to determine whether or not the telephone number is assigned. Initially, it is determined whether the telephone number is a portable telephone number (step 610). This determination is performed by consulting the LERG which contains a field for each line range indicating whether or not the particular line range is portable or not. If the telephone number is not a portable telephone number ("NO" path out of decision step 620), then the telephone number is tested using the second or third embodiment of the present invention as will be described in more detail below (step 620).

If it is determined that the telephone number is a portable telephone number ("YES" path out of decision step 610), then a Query is sent to the Local Number Portability database with the telephone number (step 630). Next, it is determined whether the response received from the Local Number Portability database contains a Location Routing Number (LRN) (step 640). If the response from the Local Number Portability database does not contain a local routing number ("NO" path out of decision step 640), then the telephone number is tested using the second or third embodiment of the present invention as will be described in more detail below (step 620). If, however, the Local Number Portability database response contains a Location Routing Number ("YES" path out of decision step 640), then the telephone number is marked as assigned, and the service provider associated with the telephone number is set based on the Location Routing Number (step 650). The test is then repeated for each telephone number in the list of test telephone numbers. It should be recognized that the method illustrated in FIG. 6 can be modified such that it is performed using only the Local Number Portability database. Specifically, the Local Number Portability database will represent a statistical sample of the market. This modification would result in the removal of the "NO" paths out of decision steps 610 and 640, and the removal of step 620 from such a method.

The present invention employs the Location Routing Number to determine which service provider a particular MDN is currently being served by. This determination can be performed using a lookup table which associates Location Routing Numbers with service providers, and such information can be obtained from Telcordia's Local Exchange Routing Guide (LERG), or other such sources of information. If an MDN has been ported, the computer 505 updates its database to reflect the new service provider associated with the particular MDN. Since the LNP database is required to contain MDNs that are ported, all MDNs in this database by definition are assigned. Unassigned telephone numbers that have been ported need to be returned to the donor/native wireless service provider, and thus, are removed from the LNP database. A MDN that has been ported is assumed to be assigned. Of course, the system can test an MDN, if necessary, using the second and/or third embodiments of the invention. Using MDN porting information, the generation of the market statistics described in detail below can account for the fact that a wireless service provider may not possess all of the telephone numbers within a particular line range.

Figure 7:
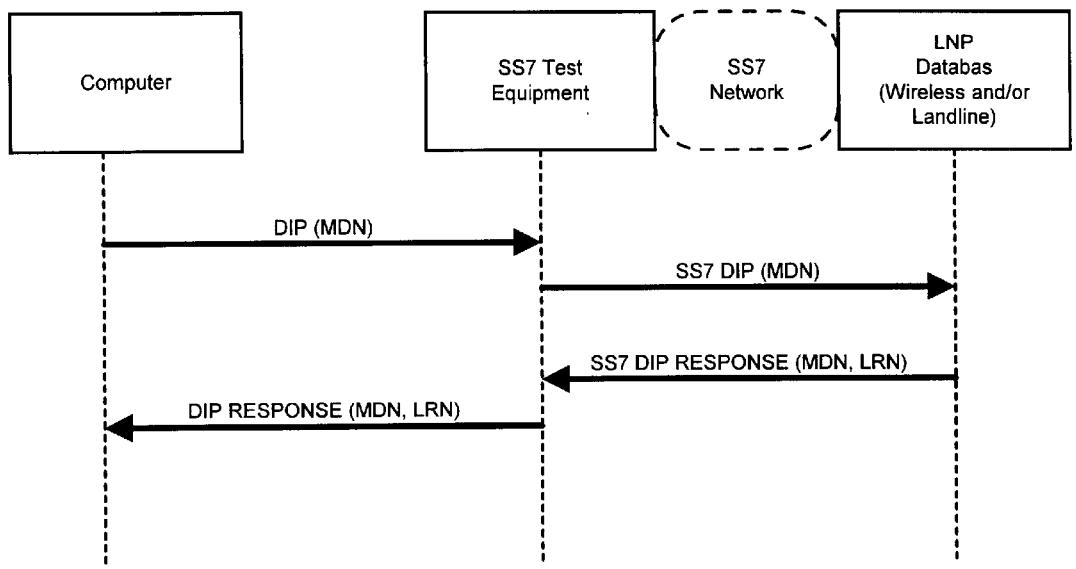
FIG. 7 illustrates a signaling diagram for measuring market statistics in systems which employ local number portability in accordance with exemplary embodiments of the present invention.

FIG. 7 illustrates the signaling of a Local Number Portability database DIP in accordance with exemplary embodiments of the present invention. The computer sends a message to the SS7 test equipment instructing the SS7 test equipment to perform a Local Number Portability database DIP. The message sent from the computer includes the MDN for which the database DIP is requested. The SS7 test equipment sends an SS7 DIP message, including the MDN, to the Local Number Portability database. As illustrated in FIG. 7, the particular Local Number Portability database to which the SS7 DIP message is sent can be a database for MDNs and/or a landline phone numbers. The Local Number Portability database responds with an SS7 DIP response message containing the MDN and the Location Routing Number. If a MDN has not been ported, the LRN field of the SS7 DIP response message will not contain a Location Routing Number. If the MDN has been ported, the SS7 DIP response message will contain a Location Routing Number in the form of a destination point code. The SS7 test equipment forwards the DIP response to the computer.

Figure 8:
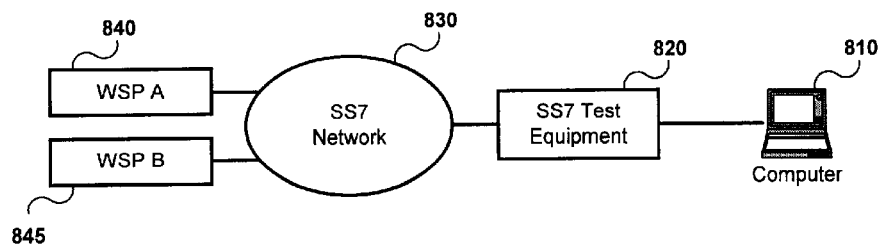
FIG. 8 illustrates an exemplary system for measuring market statistics in accordance with a second embodiment of the present invention.

In accordance with the second embodiment of the present invention, the IS-41 Mobile Application Part (MAP) functionality of the SS7 Transactional Capabilities Application Part (TCAP) is employed. FIG. 8 illustrates an exemplary system for testing MINs in accordance with the second embodiment of the present invention. The system illustrated in FIG. 8 includes a computer 810, Signaling System 7 (SS7) test equipment 820, an SS7 network 830, a wireless service provider A 840 and a wireless service provider B 845.

The computer 810 can be any commercially available computer, e.g., a Dell desktop computer running the Microsoft Windows XP operating system. The SS7 test equipment 820 can be any available SS7 test equipment, e.g., Sentinel by Tekelec, Spectra by Inet, or Signaling Advisor by Agilent. The SS7 network represents the entire SS7 network which extends throughout the country and the world. Wireless service provider A 840 and wireless service provider B 845 represent the networks of these service providers.

As illustrated in FIG. 8, the computer 810 is connected to control SS7 test equipment 820. If the computer 810 and SS7 test equipment 820 are co-located, these two devices can be connected via either a standard serial link (RS-232-C), or a standard Ethernet connection (10BaseT). If computer 810 and SS7 test equipment 820 are not co-located, these devices can be connected using a variety of well known methods, e.g., a leased telephone line, a dial up modem, or an Internet connection. Although computer 810 and SS7 test equipment 820 are illustrated as separate components, they can be combined in a single component, e.g., the SS7 test equipment 820 can contain the control program which would run on computer 810. The SS7 test equipment 820 is connected to the SS7 network, typically through the commercial network of a wireless service provider. Specifically, the SS7 test equipment 820 is typically located inside a wireless service providers equipment room, e.g., a switch room, or connected through an external link (e.g., T1) to the provider's equipment. It should be noted that the SS7 test equipment 820 need not be located in the same market as that of the MINs being tested.

Figure 9A:
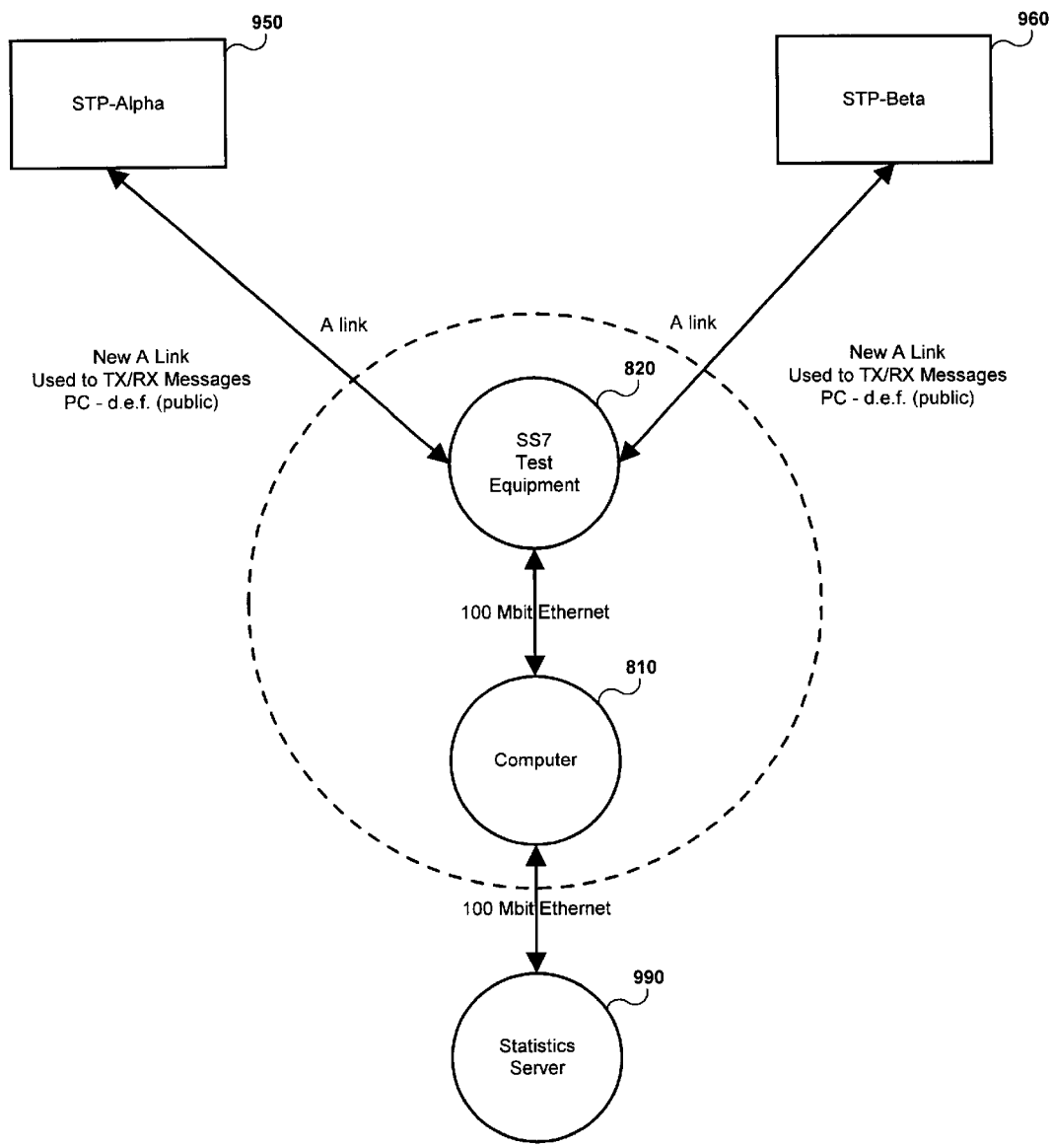
FIG. 9A illustrates a first alternative system for measuring market statistics in accordance with the second embodiment of the present invention.

FIG. 9A illustrates an exemplary system in accordance with a second alternative of the second embodiment of the present invention. As illustrated in FIG. 9A, the computer 810 is connected via a 100 Mbit Ethernet connection to the SS7 test equipment 820. The computer 810 is also connected, via a 100 Mbit Ethernet connection, to a statistics server 990. The statistics server 990 collects the market statistics processed by computer 810. However, a statistics server is not a necessary component of the present invention. In the embodiment illustrated in FIG. 9A, the SS7 test equipment 820 is connected to the SS7 network via Signal Transfer Points (STP) Alpha 950 and Beta 960. Specifically, the SS7 test equipment 820 is connected to the Signal Transfer Points via a conventional A link.

Figure 9B:
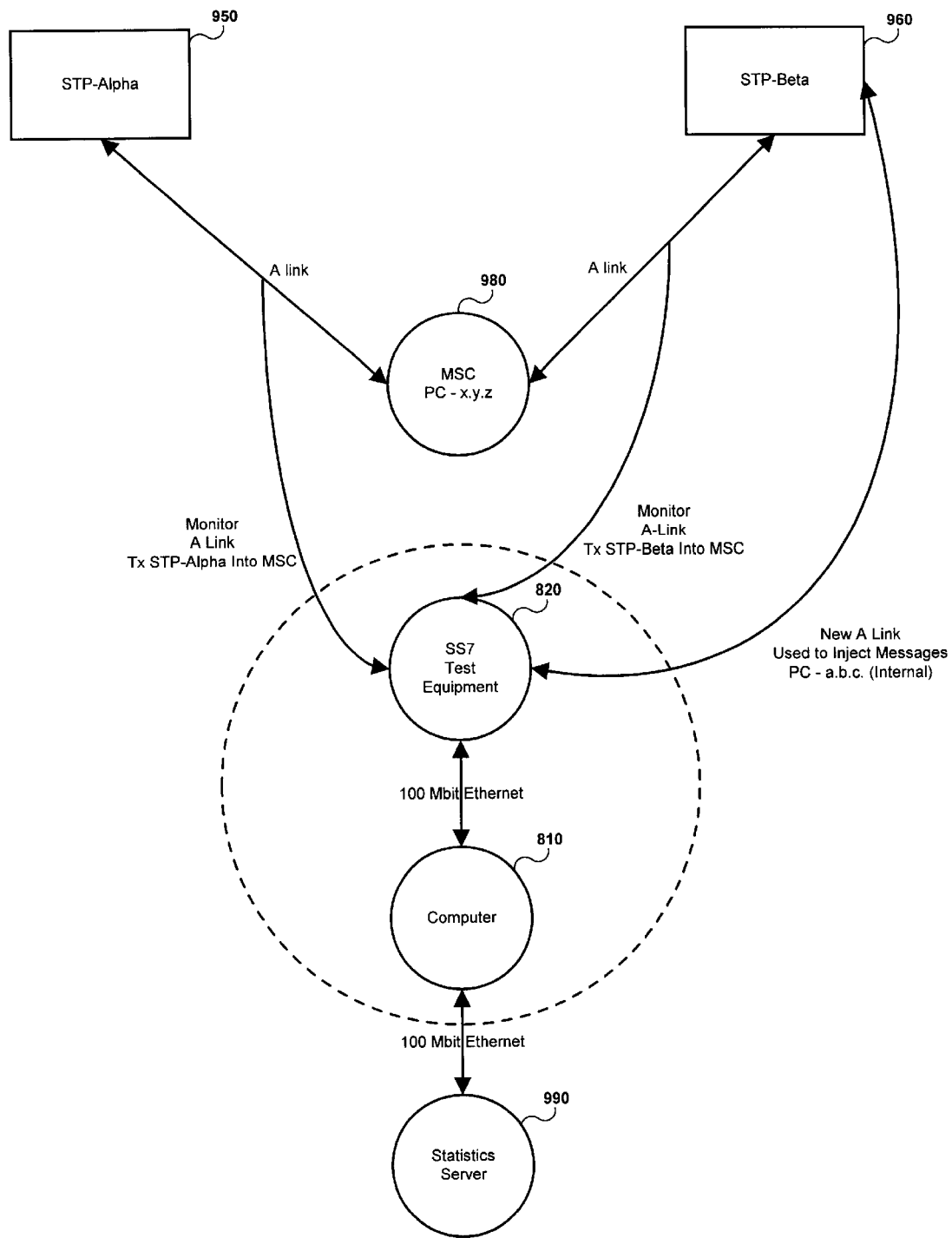
FIG. 9B illustrates a second alternative system for measuring market statistics in accordance with the second embodiment of the present invention.

FIG. 9B illustrates an alternative technique for connecting to the SS7 network in accordance with the present invention. In embodiment illustrated in FIG. 9B, instead of having a direct A link between the SS7 test equipment 820 and the two Signal Transfer Points Alpha 950 and Beta 960, the SS7 test equipment has a monitoring link to the two A links, and a new A link to Signal Transfer Point Beta 960. It will be recognized that a new A link can also be made to Signal Transfer Point Alpha 950, however, such redundancy is not required.

The new A link is assigned a test point code. The SS7 test equipment 820 sends messages over the new A link using the same originating point code as the mobile switching center (MSC) 980. Since the test messages are sent over the new A link, the mobile switching center 980 does not see the outgoing test messages sent by the SS7 test equipment 820. Similarly, the SS7 test equipment 820 does not see the outgoing mobile switching center messages sent by the mobile switching center 980. The mobile switching center will receive the responses to the messages sent over the new A link, but the mobile switching center will ignore these messages. SS7 TCAP messages have transaction IDs that uniquely identify each message. The test messages contain transaction IDs that do not conflict with ones from the mobile switching center, i.e., they employ mutually exclusive transaction IDs. Likewise, the SS7 test equipment 820 ignores messages intended for the mobile switching center 980. It will be recognized that the connections illustrated in FIGS. 9A and 9B are merely exemplary, and that one of ordinary skill in the art can connect to the SS7 network in other manners.

Figure 10:
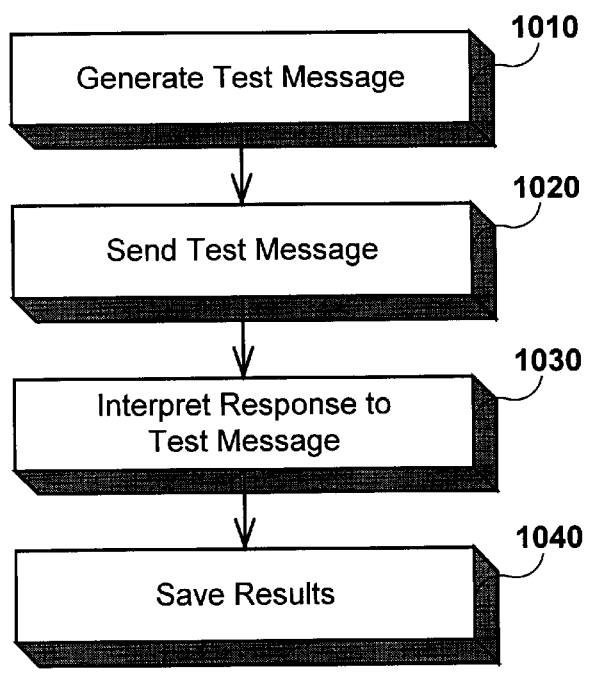
FIG. 10 illustrates an exemplary method for testing telephone numbers in accordance with the second embodiment of the present invention.
Figure 11:
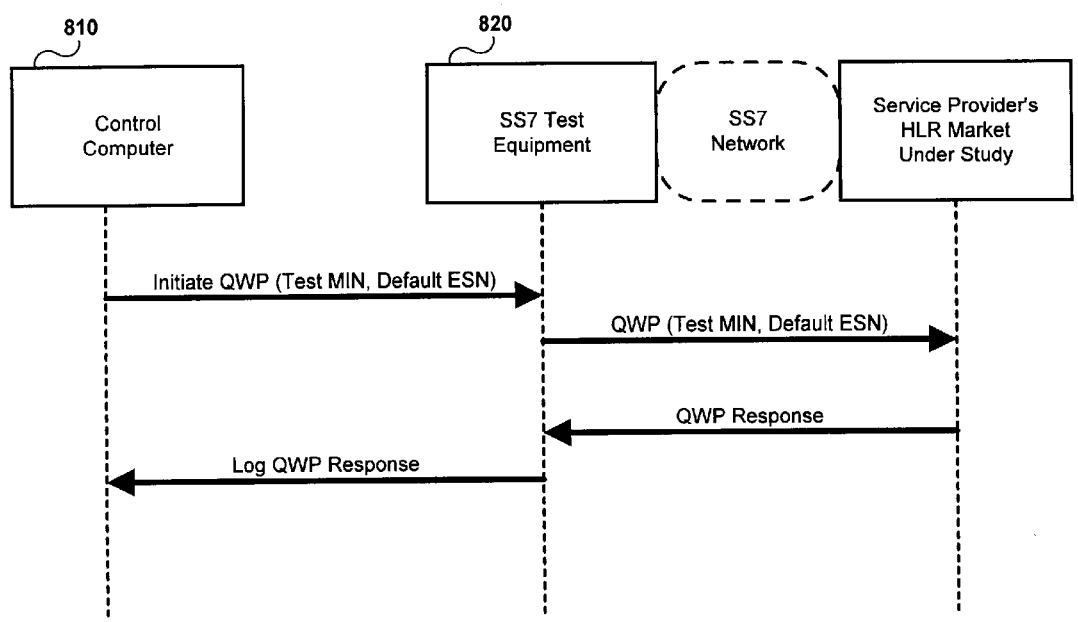
FIG. 11 illustrates an exemplary signaling diagram for testing telephone numbers in accordance with the second embodiment of the present invention.

FIG. 10 illustrates an exemplary method for testing telephone numbers in accordance with the second embodiment of the present invention. FIG. 11 illustrates exemplary signaling between various system nodes in accordance with the second embodiment of the present invention. Initially, a test message is generated by the SS7 test equipment 820 under the control of the computer 810 (step 1010). As discussed above, the second embodiment uses the IS-41/MAP functionality of SS7 TCAP to test the telephone numbers. Accordingly, the second embodiment of the present invention employs a "Query With Permission" type message to test the telephone numbers. In accordance with exemplary embodiments of the present invention, the Qualification Request message ("QUALREQ") is employed to test the telephone numbers. However, it will be recognized that other types of "Query With Permission" messages can be employed, so long as the response to such a message can identify whether or not a telephone number is assigned to a subscriber.

As illustrated in FIG. 11, the computer 810 sends an Initiate "Query With Permission" type message to the SS7 test equipment 820. The "QUALREQ" message employs two main variables, a MIN and an Electronic Serial Number (ESN). An ESN is a unique 8 digit hexadecimal number unique to a particular wireless device. The ESN is programmed into the wireless device during the manufacturing process and is not altered or changed afterwards. When a subscription with a wireless service provider is initiated for a wireless device, the wireless service provider assigns an MIN to the wireless device, and stores an association between the assigned MIN and the ESN of the wireless device in the wireless service provider's Home Location Register (HLR). When a wireless device makes an authentication attempt, the HLR determines whether the MIN/ESN pair sent by the wireless device matches a stored MIN/ESN pair for the particular wireless device. If there is a match, the user is authenticated. If there is no match then the authentication attempt fails.

In accordance with the second embodiment of the present invention, instead of employing the "QUALREQ" message for authentication, this message is employed to determine whether or not a particular MIN has been assigned. Moreover, the ESN associated with a particular MIN is not known to the computer 810 and SS7 test equipment 820. Accordingly, the present invention employs a default ESN, e.g., B3EE1C17, with each MIN in the "Query With Permission" type message. As illustrated in FIG. 11, after receiving the Initiate command, the SS7 test equipment 820 sends the "Query With Permission" message, via the SS7 network, to the wireless service provider's HLR (step 1020).

After receiving the "Query With Permission" type message, the HLR checks its database to determine whether the MIN/ESN pair in the message matches that stored in the database. Since the present invention employs a default ESN, the MIN/ESN pair in the "Query With Permission" type message will not result in an authentication. Accordingly, the "Query With Permission" type response sent by the HLR to the SS7 test equipment will contain an error message with an explanation of why the authentication failed. The "Query With Permission" response is forwarded by the SS7 test equipment 820 to the computer 810. The computer 810 interprets the error message to determine whether or not a MIN is assigned (step 1030).

Possible responses to the "Query With Permission" message include "Unrecognized MIN", "HLR/MIN Mismatch", and "Unassigned Directory Number". These messages are interpreted as the test MIN not being assigned. Other possible responses are "Invalid serial number" and "Unrecognized ESN", which are interpreted as the test MIN being assigned because the default ESN does not match the information in the HLR. It will be recognized that the particular response to a "Query With Permission" type message depends on how the HLRs of a particular network are administered. Accordingly, responses to the "Query With Permission" type message other than those listed above are possible. These responses will contain error codes which can be interpreted to determine whether or not the MIN has been assigned. After interpreting the response to the "Query With Permission" type message, the computer 810 stores the results of whether or not the test MIN is assigned (step 1040). The present invention according to the second embodiment allows a large number of MINs to be tested in a short period of time. For example, 3 to 15 MINs can be tested per second.

Figure 12:
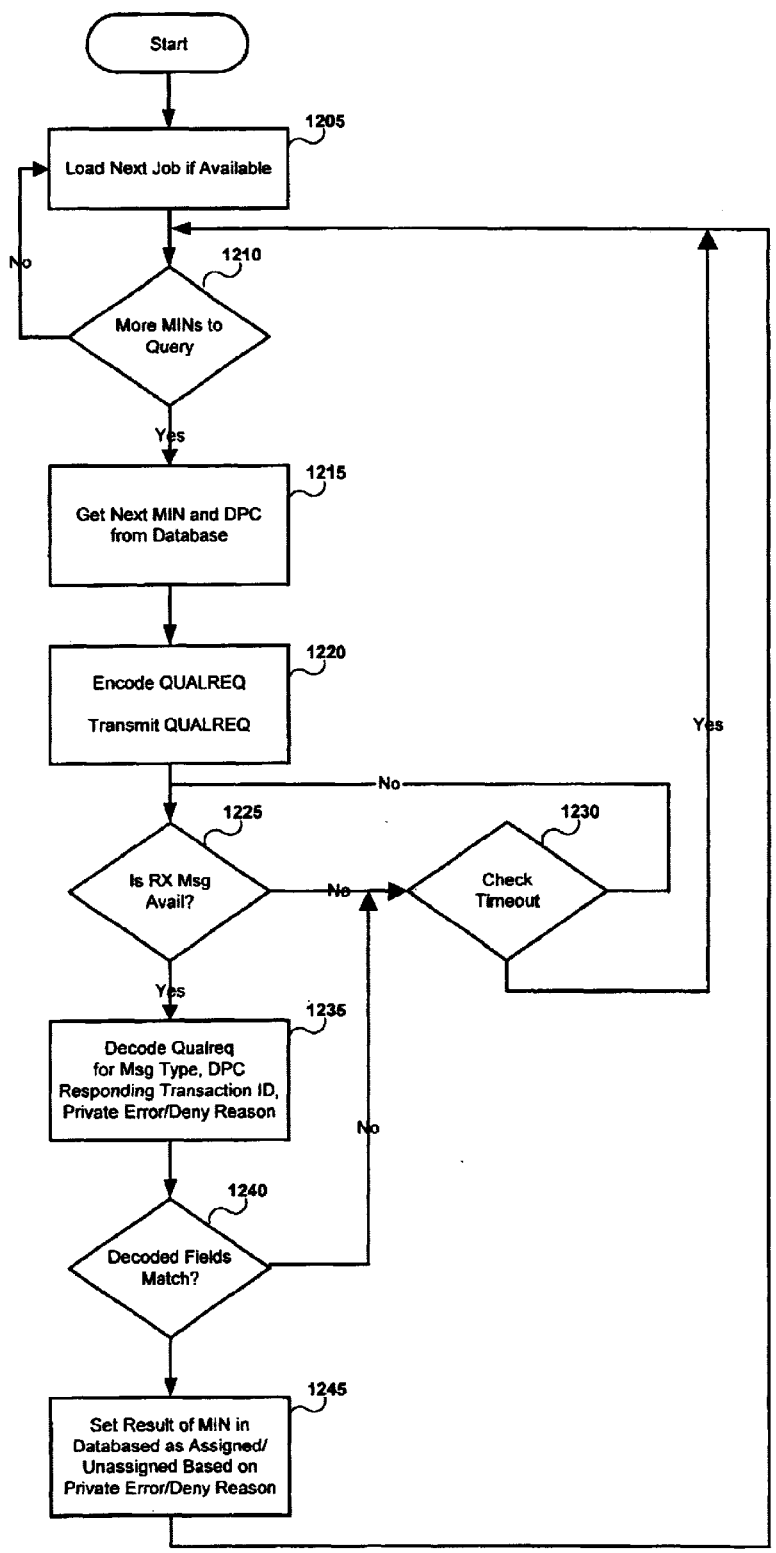
FIG. 12 illustrates a detailed exemplary method for testing telephone numbers in accordance with the second embodiment of the present invention.

FIG. 12 illustrates a more detailed method for testing telephone numbers in accordance with the second embodiment of the present invention. The computer 810 loads the next job into the SS7 test equipment 820, if a next job is available (step 1205). Next, it is determined whether there are more MINs to query in the loaded job (step 1210). If there are no MINs to query in the loaded job ("NO" path out of decision step 1210), then the next job is loaded (step 1205).

If there are more MINs in the loaded job to query ("YES" path out of decision step 1210), then the next MIN and the associated destination point code are retrieved from the database in computer 810 (step 1215). The particular message employed for testing the MIN is a "QUALREQ" message. Accordingly, a QUALREQ message is encoded and transmitted to a home location register based on the destination point code (step 1220). Next, it is determined whether a message has been received in response to the QUALREQ message (step 1225). If a message has not been received ("NO" path out of decision step 1225), then it is determined whether a timeout has occurred (step 1230). SS7 message response times are typically less than 1 second. This embodiment employs a timeout value of 5 seconds, however, network specific conditions may necessitate the adjustment of this value. If a timeout has not occurred ("NO" path out of decision step 1230), then the system continues to wait for the response message to be received (step 1225). If, however, the timeout has occurred ("YES" path out of decision step 1230), then it is determined whether there are more MINs to query (step 1210).

The particular type of message received in response to a QUALREQ message is known as a "qualreq" response.

Accordingly, if a qualreq response message has been received ("YES" path out of decision step 1225), then the qualreq message is decoded to determine the message type, the originating point code, the responding transaction ID, and the private error/deny reason (step 1235). Next, it is determined whether the decoded fields match (step 1240). The destination point code of the outgoing QUALREQ message is matched to the originating point code of the incoming qualreq response. In addition, the QUALREQ's originating transaction ID is matched to the qualreq's responding transaction ID. Furthermore, the message type of the received qualreq response needs to be a TCAP Return Error or TCAP Return Result. The private error code/deny reason determines whether or not a MIN is assigned or unassigned. If the decoded fields do not match ("NO" path out of decision step 1240), then it is determined whether a timeout has occurred (step 1230). If, however, the decoded fields match ("YES" path out of decision step 1240), then the result of the testing of the MIN is set in the database of computer 810 as "Assigned" or "Unassigned" based on the private error/deny reason (step 1245).

Figure 13:
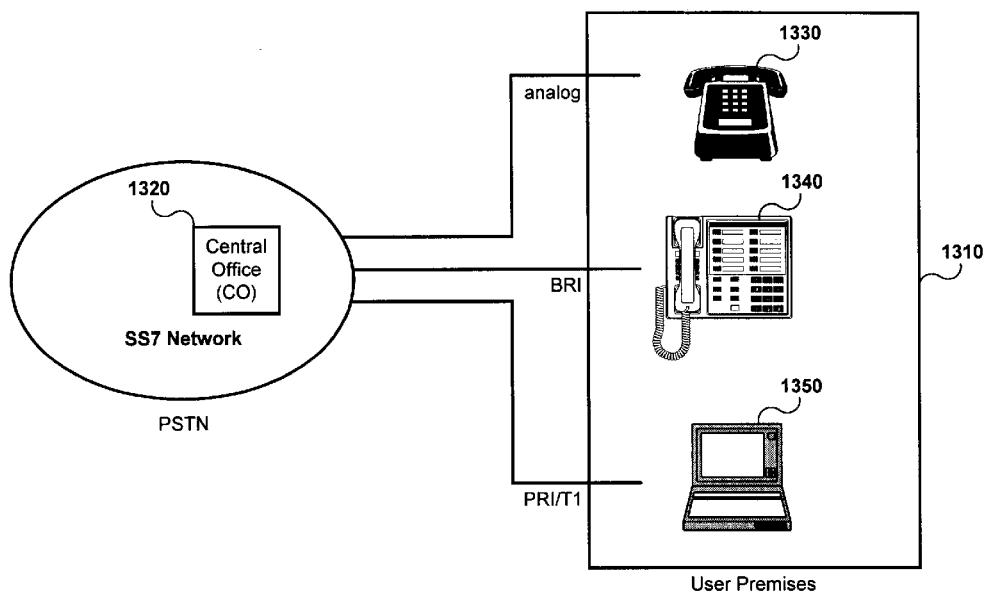
FIG. 13 illustrates an exemplary system for measuring market statistics in accordance with a third embodiment of the present invention.

FIG. 13 illustrates an exemplary system in accordance with the third embodiment of the present invention. The third embodiment of the present invention employs a digital connection to the SS7 ISDN User Part (ISUP) network to test MINs. Specifically, the third embodiment of the present invention employs digital messages, in-band tones, and voice announcements received on the digital connection. Digital messages include the CONNECT message and the Unallocated Number message; in-band tones include fast busy, busy, silence, and ring tones; and voice announcements include prerecorded voice messages sent by the telephone network, e.g., "The number you have called is no longer in service."

FIG. 13 illustrates a user premises 1310 connected with an analog connection and two digital connections to a Central Office (CO) 1320 in the SS7 network. The two digital connections are simple extensions of the ISUP portion of the SS7 network. The user premises can include a standard analog telephone 1330 with an analog connection to the Central Office 1320, and a digital telephone 1340 and a computer 1350 with digital connections to the Central Office 1320. Although FIG. 13 illustrates the user premises being directly connected to the SS7 network, it will be recognized that the user premises can also be connected to the SS7 network through the Internet. The advantage of connecting to the SS7 network via the Internet is the elimination of the need for the ISDN terminal adapter and the Central Office, and the cost savings of equipment and the cost of the ISDN line.

Figure 14:
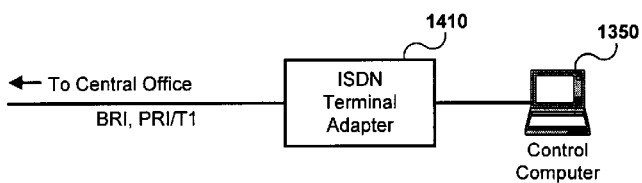
FIG. 14 illustrates details of the exemplary system for measuring market statistics in accordance with the third embodiment of the present invention.

FIG. 14 illustrates the digital connection between the computer 1350 and the Central Office 1320 in detail. Specifically, the computer 1350 is connected to an Integrated Services Digital Network (ISDN) terminal adapter 1410. The terminal adapter 1410 can either be a separate component with a connection via, e.g., 10BaseT or RS-232-C, with the computer 1350, or can be internal, e.g., a PCI card. A specific example of such a terminal adapter is the EICON DIVA Server PRI/T1. The digital connection between the computer 1350 and the Central Office 1320 can be either an ISDN Basic Rate Interface (BRI), Primary Rate Interface (PRI), or a T1 (in the United States) or an E1 line (in Europe).

The BRI is composed of two bearer (B) channels and one data (D) channel, and is commonly referred as 2B+D. The B channel data rate is 64 kbps and the D channel data rate is 16 kbps. The bearer channel transports user information, such as user data or digitized voice, while the data channel transports packetized user data, e.g., X.25 data, and call control information. The PRI is composed of 23 B channels with a 64 kbps data rate and a D channel with a 64 kbps data rate. The PRI is commonly referred to as 23B+D. Similar to a PRI, a T1 provides a 1544 kbps data rate. However, the T1 supports 24 bearer channels, employing signaling on the bearer channels using certain bits from certain frames for control information. It will be recognized that an ISDN terminal adapter can interface with both a PRI or a T1 line, and hence, in the following the PRI and T1 will be jointly referred to by PRI/T1. The functionality of a BRI or a PRI/T1 is the same, and the selection of a BRI or a PRI/T1 will depend upon the desired capacity. Since PRI/T1 have more bearer channels than a BRI, the PRI/T1 has 11.5/12 times the capacity of a BRI.

Figure 15:
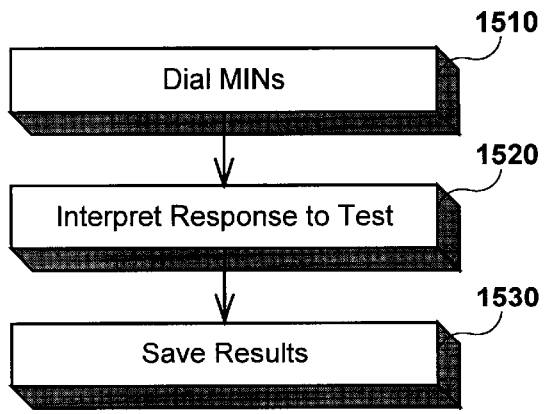
FIG. 15 illustrates an exemplary method for testing telephone numbers in accordance with the third embodiment of the present invention.

FIG. 15 illustrates an exemplary method for testing MINs in accordance with the third embodiment of the present invention. Initially, the computer 1350 dials the MINs through digital messaging (step 1510). If the computer is connected using a PRI/T1, 23/24 MINs can be dialed simultaneously. In addition to dialing the MINs, the ISDN terminal adapter sends information to establish an "early B channel connect". The early B channel establishment allows the computer 1350 to receive in-band signaling information on the B channel, such as ring tones and terminating announcements, prior the receipt of any potential CONNECT indication. The CONNECT message is a digital message received from the network which indicates that the far end has answered. In addition to the CONNECT message, there are other digital messages that can be used to classify MINs (e.g., Unallocated number). The early B channel establishment establishes a reverse B channel communication path from the Central Office 1320 to the ISDN terminal adapter 1410. Typically, such a reverse path is not established until the CONNECT message is received. Once a MIN has been dialed, a confirmation comes from the far-end to acknowledge receipt of the call, and then data packets start to arrive at the ISDN terminal adapter from the network. Accordingly, the present invention interprets the received data packets to determine whether or not a MIN is assigned (step 1520). Finally, the results of whether or not the MIN is assigned are stored (step 1530).

Figure 16:
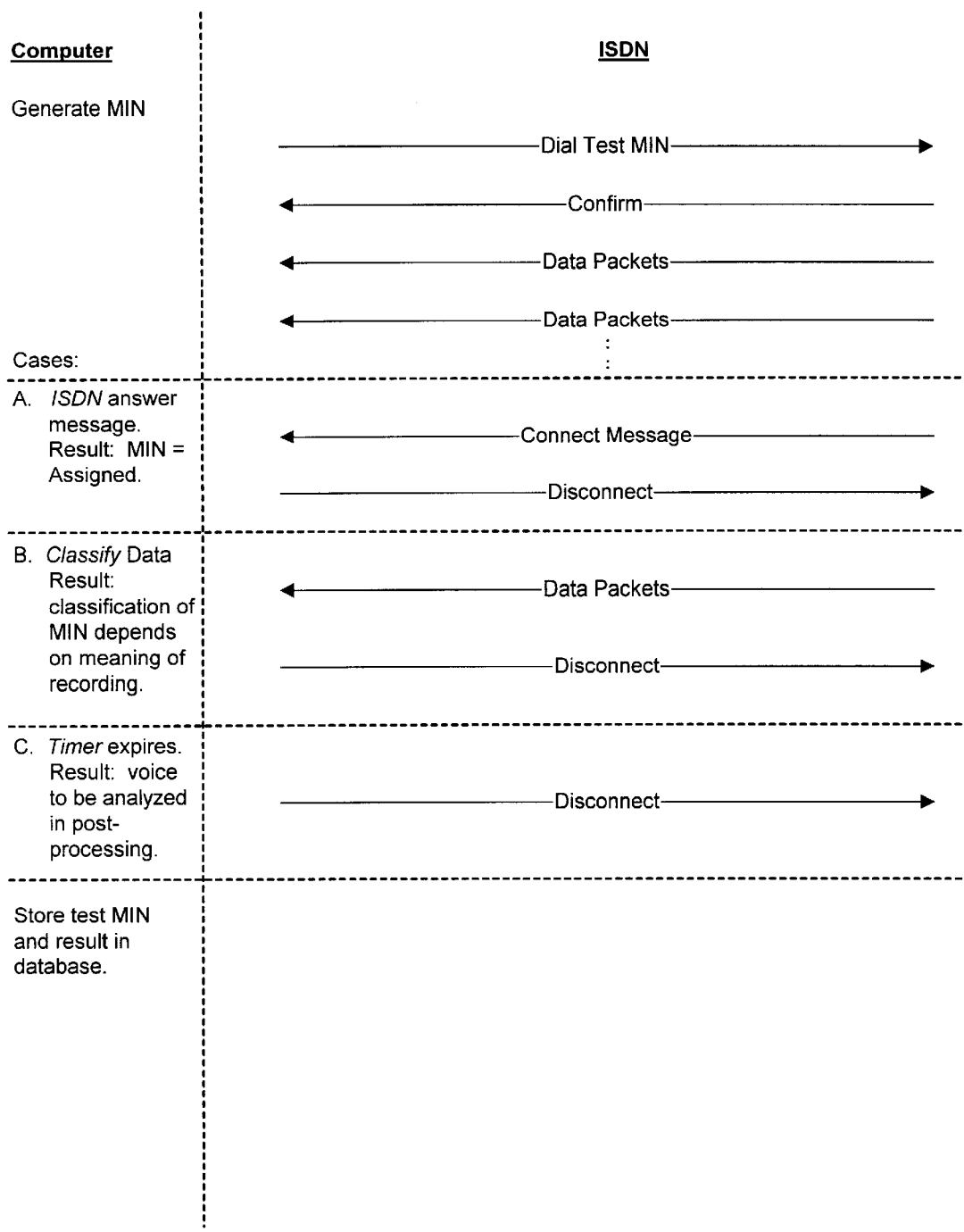
FIG. 16 illustrates an exemplary signaling diagram for testing telephone numbers in accordance with the third embodiment of the present invention.

FIG. 16 illustrates the signaling associated with the method of FIG. 15. As illustrated in FIG. 16, there are three possible cases in the classification of a MIN. If a CONNECT message is received by the ISDN terminal adapter 1410, then it is determined that the MIN is assigned. The Central Office sends the CONNECT message to the ISDN terminal adapter if the call is answered either by the subscriber or by a voice mail system. The ISDN terminal adapter immediately sends this indication to the computer, and within several milliseconds the computer terminates the call by sending a release message. The control computer then marks the particular MIN as being assigned.

If a connect message is not received, the data packets received over the bearer channel are examined to determine the classification of the MIN. Specifically, the system stores data packets received up to 2 minutes after the test MIN is dialed. Depending upon the data packets received by the ISDN terminal adapter 1410, the classification of the MIN is either determined in real-time, or the classification is determined in post-processing. Once the MIN is classified, or after it is determined that the classification should be performed in post-processing, the call to the MIN is disconnected. The disconnection can occur after receiving data packets for 20 seconds if the data packets contain voice information, or 5 seconds if the data packets contain a fast busy tone. If the call treatment proceeds for the entire 2 minutes, then the total seconds of ringing tones can be used as an indication of whether or not the test MIN is assigned to a subscriber. For example, a telephone number which rings for 90 to 120 seconds and then goes to a fast busy tone, is more likely to be assigned to a valid user than to be unassigned.

Figure 17:
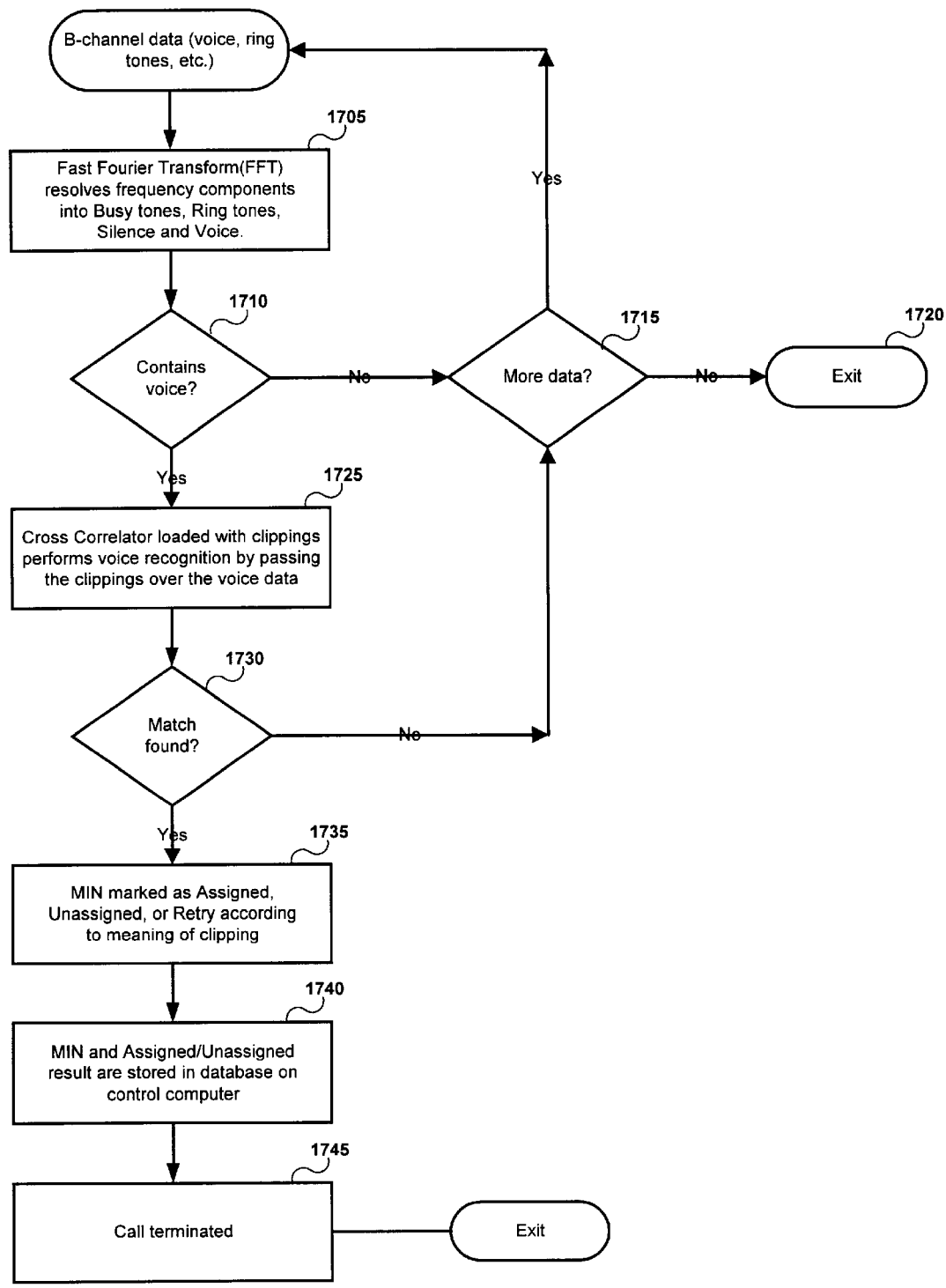
FIG. 17 illustrates an exemplary method for interpreting test results in accordance with the third embodiment of the present invention.

FIG. 17 illustrates an exemplary method for analyzing data packets received over the bearer channel in accordance with the third embodiment of the present invention. B-channel data packets are received by the computer and a Fast Fourier Transform (FFT) is performed on the received packets to resolve the frequency components (step 1705). Specifically, the FFT assists in the determination of whether the received data packets contain busy tones, ring tones, silence or voice information. The use of the FFT algorithm allows the computer to dynamically determine the duration of the call treatment. If no CONNECT message is received for a particular test MIN, then the entire purpose of storing the call treatment is to obtain enough information so that the test MIN can be appropriately classified.

Using the FFT to determine silence, ringing, fast busy tones, and voice, allows calls that have produced enough voice or calls that are producing no voice, i.e., fast busy, to be terminated early, thereby increasing the number of calls per minute. The FFT gives the control computer a dynamic, intelligent dimension to assist in the gathering of information that will be used to determine whether or not a test MIN is assigned. Accordingly, the FFT allows the determination of whether or not a telephone number is assigned based on the receipt of busy tones, ring tones, and other types of signaling contained in the data packets.

Using the frequency components, it is determined whether the data packets contain voice information (step 1710). If the data packets do not contain voice information ("NO" path out of decision step 1710), then it is determined whether more data packets have been received for the test MIN (step 1715). If more data packets have not been received ("NO" path out of decision step 1715), then the data packets are analyzed in post-processing (step 1720). If, however, more data packets are received ("YES" path out of decision step 1715), then the system continues to analyze the received data packets to determine whether they contain voice information (steps 1705 and 1710).

If it is determined that the data packets contain voice information ("YES" path out of decision step 1710), then a cross correlator running on the computer is loaded with clippings to perform pattern recognition (step 1725). As will be described in more detail below the cross correlation is performed by passing the clippings over the voice information. If the cross correlation does not produce a match ("NO" path out of decision step 1730), then it is determined whether more data packets have been received (step 1715), and processing continues as described above. If, however, the cross correlation does produce a match ("YES" path out of decision step 1730), the MIN is marked as "Assigned", "Unassigned", or "Retry" according to the meaning of the clip (step 1735). MINs which are marked as "Retry" are redialed at a later time. The MIN and the "Assigned" or "Unassigned" result are stored in a database on the computer (step 1740), and the call is terminated (step 1745).

Figure 18:
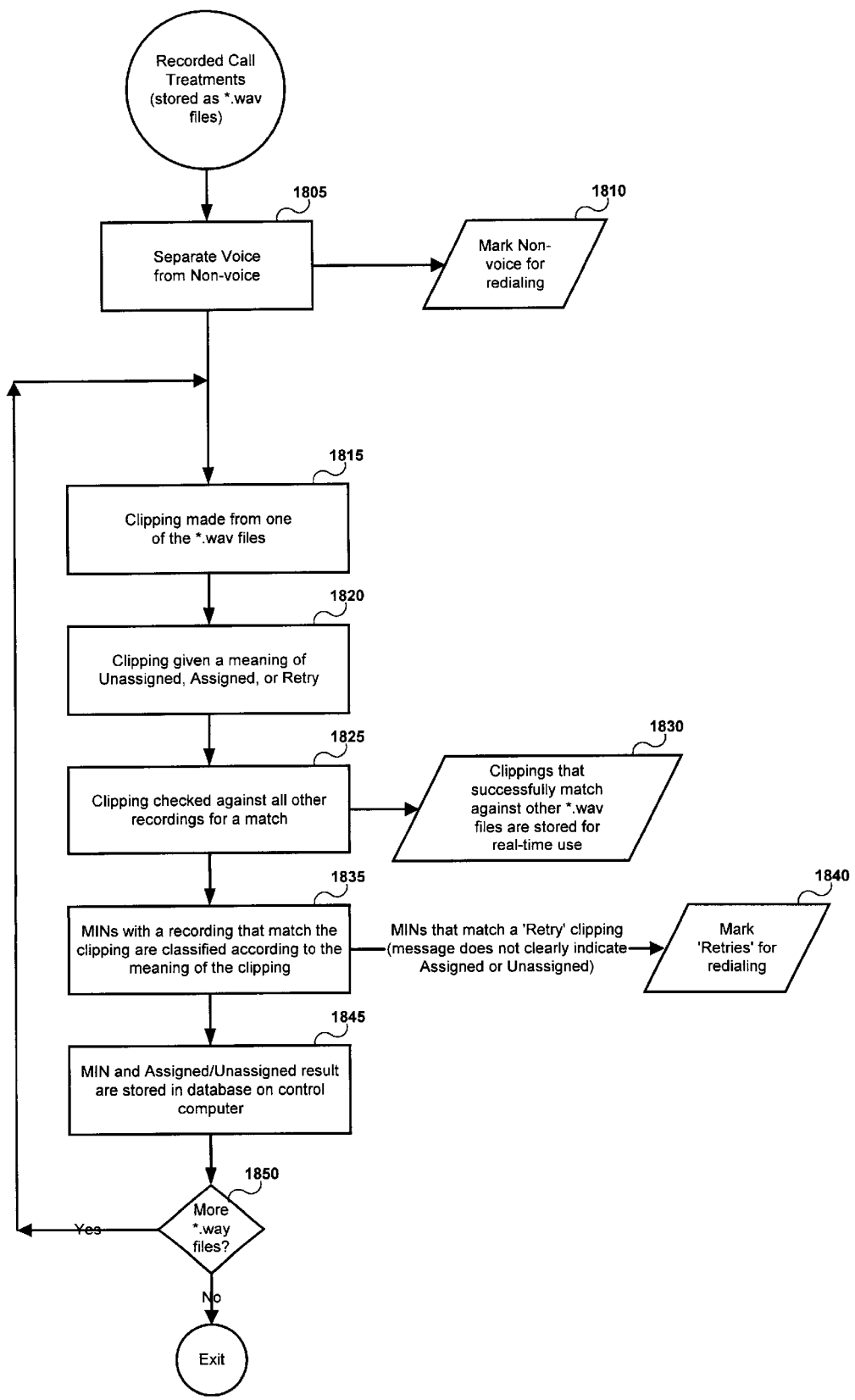
FIG. 18 illustrates an exemplary method for initializing the system to interpret the results of the testing of telephone numbers in accordance with the third embodiment of the present invention.

As discussed above, the cross correlation employs clippings for the classification of data packets. Since the present invention employs a digital line to test MINs, the received data packets will be subject to less distortion compared to information received over a conventional analog line, and hence, correlation of received voice data is more accurate. FIG. 18 illustrates an exemplary method for generating the clippings in accordance with the third embodiment of the present invention. To obtain the clippings a sample containing a certain percentage of the total number of test MINs are dialed, and the results are stored as, for example, .wav files. Initially the .wav files are separated into voice and non-voice (step 1805). The non-voice files are marked for redialing (step 1810). One of the files which contains voice information is selected and used to make a clipping (step 1815). A clipping is a .wav file that contains a minimum amount of information to uniquely classify the MIN. The clipping can be performed using a variety of different types of software, including music editing software such as Sonic Sound Foundry, CoolEdit, and Nero Wave Editor.

FIG. 19 illustrates a plurality of .wav files, the clipping made from the .wav file and the meaning assigned to the clipping. As illustrated in FIG. 14, a .wav file which contains the sentence "The subscriber you have called is not answering at this time" is parsed into a clipping of "Is not answering". Accordingly, the clipping "Is not answering" is the minimum amount of information required to uniquely identify a .wav file as being associated with an assigned MIN. In FIG. 19 the words highlighted in the .wav file are used in generating the clipping. The clippings are then associated with a meaning of "Unassigned", "Assigned", or "Retry" (step 1820). The clipping is then compared against all other recordings in the sample of test MINs (step 1825). If the clipping matches a portion of at least one of the .wav files for the other MINs in the sample, the clipping is stored for use in the cross-correlation process described above in connection with FIG. 17 (step 1830). Step 1830 reduces the number of clippings which are examined by eliminating clippings which have already been assigned a meaning. MINs in the sample which are associated with .wav files which match the clipping are classified according to the meaning of the clipping (step 1835).

MINs associated with .wav files which have a meaning of "Retry" are marked for redialing (step 1840). MINs associated with .wav files which have a meaning of either "Assigned" or "Unassigned" are stored in the database in the computer with the appropriate meaning (step 1845). Finally, it is determined whether there are more .wav files in the sample (step 1850). If there are no more .wav files in the sample ("NO" path out of decision step 1850), then the sampling processing ends and the clippings are loaded into the computer for comparison to the received data packets. If, however, there are .wav files in the sample which have not had their meaning determined ("YES" path out of decision step 1850), then a clipping is performed on the next .wav file in the sample in accordance with steps 1815–1845.

After the MINs have been tested in accordance with the techniques of the first, second or third embodiment described above, statistics are generated using the result of the tests. FIG. 20 illustrates a method for generating statistics in accordance with exemplary embodiments of the present invention. As illustrated in FIG. 20, there are three different statistics generated using the tested MINs. Specifically, market share (step 2010), subscriber churn (step 2020), and gross additions (step 2030) are calculated. It will be recognized that the order in which the statistics are calculated in FIG. 20 is merely exemplary, and that these statistics can be calculated in any order.

FIG. 21A illustrates an exemplary table of data collected during the MIN testing procedures, and the calculation of market share in accordance with the present invention. The calculation of market share can be performed while the testing of MINs is proceeding or after the testing has been completed. To determine market share, the number of MINs marked as "Assigned" is divided by the sample rate to estimate the total number of actual MINs for the specified NPA-NXX-X ranges. In the table illustrated in FIG. 21A, 325 test MINs out of 500 were determined to be assigned in the NPA-NXX-X ranges 434-426-0 through 434-426-9. Thus, the total number of assigned MINs for all ranges is estimated as 325÷0.05=6,500. This process is repeated for all line ranges. In the table illustrated in FIG. 21A, wireless service provider A is estimated to have a total of 13,400 subscribers, while wireless service provider B is estimated to have a total of 17,000 subscribers. If wireless service providers A and B are the only wireless service providers in a market, the total number of subscribers in the market is 30,400. Therefore, wireless service provider A has a market share of 44.1% (i.e., 13,400÷30,400), and wireless service provider B has a market share of 55.9% (i.e., 17,000÷30,400).

FIG. 21B illustrates an exemplary table storing the estimate of subscriber churn. It will be recognized that subscriber churn is a measurement of how many subscribers terminate wireless service with a particular wireless service provider during a specific time interval. This time interval is typically a month or a quarter. Using the data in the table of FIG. 21A, assume that this data was collected using a list of specific test MINs on January 1. If the same list of test MINs were measured on February 1, for each test MIN it is known whether or not the MIN was assigned or unassigned on January 1, and assigned or unassigned on February 1. Thus, subscriber churn is calculated using the number of test MINs which were assigned on January 1, but were determined to be unassigned on February 1. The result of this comparison is divided by the sample rate to estimate the total churn for each wireless service provider.

Using the data in the table illustrated in FIG. 21B, wireless service provider A had 52 test MINs which changed from "Assigned" to "Unassigned" between January 1 and February 1, and wireless service provider B had 49 test MINs which changed from "Assigned" to "Unassigned" within this time period. Accordingly, the estimated churn of MINs for wireless service provider A is 1040 (i.e., 52÷0.05) and the estimated churn of MINs for wireless service provider B is 980 (49÷0.05). The churn rate is calculated by dividing the estimated churn of MINs by the number of estimated MINs which are assigned by a particular wireless service provider. Accordingly, the churn rate for wireless service provider A is 7.76% per month (i.e., 1040÷13,400), while the churn rate for wireless service provider B is 5.76% (i.e., 980÷17,000). In addition, other churn statistics can be calculated. For example, the churn rate formula can be modified such that the denominator represents the average of the subscribers at the beginning of the measurement period and the end of the measurement period. A wireless service provider's subscriber churn share can also be calculated. For example, wireless service provider A has a subscriber churn share is 51.49%, i.e., 1040÷(1040+980).

FIG. 21C illustrates a table storing the estimated number of subscriber gross adds in accordance with exemplary embodiments of the present invention. Subscriber gross adds is a measurement of how many subscribers begin wireless service during a specific time interval, the time interval typically being a month or a quarter. Assume that the data listed in the table illustrated in FIG. 21A represents measurements of a specific list of test MINs on January 1. To determine gross add, a modified set of test MINs is used for measurement on February 1. It should also be recognized that a wireless service provider could have added new line ranges to accommodate expansion after the January 1 measurements but before the February 1 measurements. The modified set of test MINs will include the test MINs used for the January 1 measurements plus the sampling rate times the number of MINs in the new line range. For example, if wireless service provider A adds the NPA-NXX range of 434–429 in January, the February modified test MINs would include an additional 500 MINs, i.e., 10,000 new MINs times the 5% sampling rate. Thus, the present invention can determine the number of test MINs which were unassigned on January 1 but were assigned on February 1.

To calculate the estimated gross add MINs, the number of MINs unassigned on January 1 which were assigned on February 1 is divided by the sampling rate. Using the data in the table illustrated in FIG. 21C as an example, wireless service provider A and wireless service provider B had 73 and 57 test MINs, respectively, unassigned on January 1 and assigned on February 1. Using the 5% sampling rage, the estimated gross adds of MINs for wireless service provider A is 1460 (i.e., 73÷0.05), and the estimated gross adds of MINs for wireless service provider B is 1140 (i.e., 57÷0.05). In addition, other gross add formulas may be employed. For example, the gross add formula can be modified such that the denominator represents the average of the subscribers at the beginning of the measurement period and the end of the measurement period. A wireless service provider's subscriber gross add share can also be calculated. For example, wireless service provider A has a subscriber churn share is 56.15%, i.e., 1460÷(1460+1140). To calculate the gross add percentage for each wireless service provider over the one month period, the estimated gross add MINs is divided by the number of estimated MINs for that wireless service provider at the beginning of the period. Accordingly, the gross add percentage for wireless service provider A is 10.90% (i.e., 1460÷13,400), and the gross add percentage for wireless service provider B is 6.70% (i.e., 1140÷17,000).

Since the Location Routing Number obtained using the Local Number Portability DIP identifies to which particular service provider a particular MDN/telephone number is assigned to, more detailed market statistics can be generated with this information. Specifically, a measurement of ported subscribers can now be calculated. FIG. 22A illustrates a table containing data concerning ported subscribers. The table in FIG. 22A assumes that on January 1, 10,000 telephone numbers are sampled, and that each sample is served by its native service provider, i.e., the Location Routing Number field of the SS7 DIP response message indicates no Location Routing Number. The table in FIG. 22A illustrates the results of performing the Local Number Portability database DIP on February 1 for the same market. FIG. 22B illustrates the switch rate between service providers using the data in the table of FIG. 22A. The information illustrated in FIGS. 22A and 22B is useful to both landline and wireless service providers in determining who is gaining and who is losing subscribers in a particular market. The Local Number Portability database DIPs are so fast and inexpensive that it is feasible to perform the DIPs for all telephone numbers and all MDNs in a market. Accordingly, errors will be eliminated because the entire population of the market can be sampled.

Since all MDNs in a market can be quickly and inexpensively tested using the Local Number Portability database, a subscriber churn history statistic can be calculated. Specifically, by testing the MDNs over a period of time, the number of times a particular MDN has been ported over the period of time can be tracked. This information can be very useful to service providers as it shows which subscribers are more likely to stay with a service provider, and which are more likely to change service providers. Of course, a subscriber which changes wireless service providers every month is less attractive to a service provider than a subscriber which has not switched service providers for two years. Similarly, all telephone numbers for a market, whether wireless or landline, can be tested in a like manner.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for determining market statistics for a first and second service provider, comprising:

testing a plurality of telephone numbers;

automatically interpreting responses to said testing to determine whether at least one of the plurality of telephone numbers is assigned by one of the first and second service providers; and determining market statistics for the first and second service providers using the interpreted responses.

2. The method of claim 1, wherein the testing step comprises sending a message to a database associated with at least one of the plurality of telephone numbers, and wherein the determination of whether the at least one telephone number is assigned by a service provider employs a response to said message.

3. The method of claim 2, wherein said message contains a telephone number.

4. The method of claim 2, wherein said message is an authentication message which comprises a telephone number and a serial number, and wherein the serial number in the authentication message is not associated with the telephone number.

5. The method of claim 2, wherein said database is included in a home location register.

6. The method of claim 5, wherein said message is sent to the home location register via a signaling system 7 network.

7. The method of claim 2, wherein the at least one telephone number is determined to be assigned to a subscriber if the response indicates that the serial number is not invalid or the serial number is not assigned.

8. The method of claim 2, wherein said database is a telephone number portability database.

9. The method of claim 8, wherein said determination of whether the telephone number is assigned is based on receipt of a message from the database including a Location Routing Number.

10. The method of claim 9, wherein the Location Routing Number is employed to determine which service provider is associated with the telephone number.

11. The method of claim 10, further comprising:

tracking a number of times that a telephone number has been ported between service providers.

12. The method of claim 1, wherein the testing step comprises dialing the plurality of telephone numbers over a digital connection, and wherein the automatically interpreting step comprises comparing responses received over said digital connection with predetermined responses.

13. The method of claim 12, wherein said responses and said predetermined responses are digital messages, and wherein said comparison is performed automatically.

14. The method of claim 13, wherein said automatic comparison is performed by employing pattern recognition.

15. The method of claim 13, wherein said predetermined response contains a minimum amount of information to uniquely and automatically interpret said responses.

16. The method of claim 12, wherein said predetermined responses include digital messages, voice announcements, and in-band tones.

17. The method of claim 16, wherein a response is a CONNECT message which indicates that a telephone number is assigned.

18. The method of claim 16, further comprising:

distinguishing in-band tones from one another, and from voice announcements using a Fast Fourier Transform.

19. The method of claim 16, wherein said comparing step employs pattern recognition to interpret voice announcements.

20. The method of claim 12, wherein the step of comparing responses comprises:

performing a pattern recognition process on said responses;

determining whether said responses are digital messages or in-band tones; and comparing only responses not determined to be digital messages or in-band tones with the predetermined responses.

21. The method of claim 1, wherein said subscriber statistics comprises market share, subscriber churn, subscriber churn share, subscriber gross addition and subscriber gross addition share for the first and second service providers.

22. The method of claim 1, further comprising:

sending a message to a telephone number portability database;

receiving a response from said telephone number portability database; and automatically interpreting said response to determine which service provider serves a telephone number.

23. A method for determining market statistics for a first and second service provider comprising:

testing a plurality of telephone numbers by sending a message to a database associated with at least one of the plurality of telephone numbers, automatically interpreting responses to said testing by determining whether the at least one telephone number is unassigned by a service provider using a response to said message; and determining market statistics for the first and second service providers using the interpreted responses.

24. The method of claim 23, wherein the at least one telephone number is determined not to be unassigned if the response indicates that the telephone number is not recognized, the telephone number was sent to the wrong database, or the telephone number is unassigned.

25. A system for determining market statistics for a first and second service provider, comprising:
   means for testing a plurality of telephone numbers;
   means for automatically interpreting responses to said testing to determine whether at least one of the plurality of telephone numbers is assigned by one of the first and second service providers; and
   means for determining market statistics for the first and second service providers using the interpreted responses.

26. The system of claim 25, wherein
   the means for testing comprises
      means for sending a message to a database associated with at least one of the plurality of telephone numbers, and
      wherein the determination of whether the at least one telephone number is assigned by a service provider employs a response to said message.

27. The system of claim 26, wherein said message contains a telephone number.

28. The system of claim 26, wherein said message is an authentication message which comprises a telephone number and a serial number, and wherein the serial number in the authentication message is not associated with the telephone number.

29. The system of claim 26, wherein said database is included in a home location register.

30. The system of claim 29, wherein said message is sent to the home location register via a signaling system 7 network.

31. The system of claim 26, wherein the at least one telephone number is determined to be assigned to a subscriber if the response indicates that the serial number is not invalid or the serial number is not assigned.

32. The system of claim 26, wherein said database is a telephone number portability database.

33. The system of claim 32, wherein said determination of whether the telephone number is assigned is based on receipt of a message from the database including a Location Routing Number.

34. The system of claim 33, wherein the Location Routing Number is employed to determine which service provider is associated with the telephone number.

35. The system of claim 34, further comprising:
   means for tracking a number of times that a telephone number has been ported between service providers.

36. The system of claim 25, wherein
   the means for testing comprises
      means for dialing the plurality of telephone numbers over a digital connection, and
   wherein the means for automatically interpreting comprises
      means for comparing responses received over said digital connection with predetermined responses.

37. The system of claim 36, wherein said response and said predetermined responses are digital message, and wherein said comparing is performed automatically.

38. The system of claim 37, wherein said automatic comparison is performed by employing pattern recognition.

39. The system of claim 37, wherein said predetermined response contains a minimum amount of information to uniquely and automatically interpret said responses.

40. The system of claim 36, wherein said predetermined responses include digital messages, voice announcements, and in-band tones.

41. The system of claim 40, wherein a response is a CONNECT message which indicates that a telephone number is assigned.

42. The system of claim 40, further comprising:
   means for distinguishing in-band tones from one another, and from voice announcements using a Fast Fourier Transform.

43. The system of claim 40, wherein said comparing step employs pattern recognition to interpret voice announcements.

44. The system of claim 36, wherein the means for comparing responses comprises:
   means for performing a pattern recognition process on said responses;
   means for determining whether said responses are digital messages or in-band tones; and
   means for comparing only responses not determined to be digital messages or in-band tones with the predetermined responses.

45. The system of claim 25, wherein said subscriber statistics comprises market share, subscriber churn, subscriber churn share, subscriber gross addition and subscriber gross addition share for the first and second service providers.

46. The system of claim 25, further comprising:
   means for sending a message to a telephone number portability database;
   means for receiving a response from said telephone number portability database; and
   means for automatically interpreting said response to determine which service provider serves a telephone number.

47. A system for determining market statistics for a first and second service provider comprising:
   means for testing a plurality of telephone numbers comprising means for sending a message to a database associated with at least one of the plurality of telephone numbers;
   means for automatically interpreting responses to said testing comprising means for determining whether the at least one telephone number is unassigned by a service provider using a response to said message; and
   means for determining market statistics for the first and second service providers using the interpreted responses.

48. The system of claim 47, wherein the at least one telephone number is determined not to be unassigned if the response indicates that the telephone number is not recognized, the telephone number was sent to the wrong database, or the telephone number is unassigned.

49. A computer-readable medium containing a program which executes the steps of:
   testing a plurality of telephone numbers;
   automatically interpreting responses to said testing to determine whether at least one of the plurality of telephone numbers is assigned by one of the first and second service providers; and
   determining market statistics for a first and second service provider using the interpreted responses.

50. The computer-readable medium of claim 49, wherein
   the testing step comprises
      sending a message to a database associated with at least one of the plurality of telephone numbers, and
      wherein the determination of whether the at least one telephone number is assigned by a service provider employs a response to said message.

51. The computer-readable medium of claim 50, wherein said message is an authentication message which comprises a telephone number and a serial number, and wherein the serial number in the authentication message is not associated with the telephone number.

52. The computer-readable medium of claim 50, wherein said database is included in a home location register.

53. The computer-readable medium of claim 50, wherein said database is a telephone number portability database.

54. The computer-readable medium of claim 53, wherein said determination of whether the telephone number is assigned is based on receipt of a message from the database including a Location Routing Number.

55. The computer-readable medium of claim 49, wherein the testing step comprises
 sending a message to a database associated with at least one of the plurality of telephone numbers, and
 wherein the automatically interpreting step comprises
 determining whether the at least one telephone number is unassigned by a service provider using a response to said message.

56. The computer-readable medium of claim 49, wherein the testing step comprises
 dialing the plurality of telephone numbers over a digital connection, and
 wherein the automatically interpreting step comprises
 comparing responses received over said digital connection with predetermined responses.

* * * * *